(12) United States Patent
Rios et al.

(10) Patent No.: US 12,197,429 B2
(45) Date of Patent: Jan. 14, 2025

(54) SYSTEM AND METHOD FOR IMPLEMENTING A LEG COMBINATION CODE GENERATING MODULE

(71) Applicant: JPMorgan Chase Bank, N.A., New York, NY (US)

(72) Inventors: Luis Rios, Union, NJ (US); Awinash Jadhav, Princeton Junction, NJ (US); Anupam Bansal, Jersey City, NJ (US); Emre Oguz, Short Hills, NJ (US); David Greig, Torrance (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 247 days.

(21) Appl. No.: 17/457,545

(22) Filed: Dec. 3, 2021

(65) Prior Publication Data

US 2023/0177044 A1    Jun. 8, 2023

(51) Int. Cl.
*G06F 16/00*    (2019.01)
*G06F 16/242*    (2019.01)
*H04L 67/141*    (2022.01)

(52) U.S. Cl.
CPC ........ *G06F 16/2433* (2019.01); *H04L 67/141* (2013.01)

(58) Field of Classification Search
CPC ... G06F 16/2433; H04L 67/141; G06Q 40/04; G06Q 40/06
See application file for complete search history.

(56) References Cited

U.S. PATENT DOCUMENTS

| | | |
|---|---|---|
| 2005/0149428 A1 | 7/2005 | Gooch et al. |
| 2005/0160024 A1* | 7/2005 | Soderborg ............. G06Q 40/04 |
| | | 705/37 |
| 2006/0136462 A1* | 6/2006 | Campos ................ G06F 16/285 |
| | | 707/999.102 |
| 2013/0260678 A1* | 10/2013 | Ikemoto .................. H04W 4/38 |
| | | 455/39 |
| 2016/0173364 A1 | 6/2016 | Pitio et al. |
| 2021/0182963 A1* | 6/2021 | Tang ...................... G06Q 40/06 |

OTHER PUBLICATIONS

Official communication received in PCT Application No. PCT/US2021/64083, dated Mar. 17, 2022.

* cited by examiner

*Primary Examiner* — Alex Gofman
*Assistant Examiner* — Suman Rajaputra
(74) *Attorney, Agent, or Firm* — GREENBLUM & BERNSTEIN, P.L.C.

(57) ABSTRACT

Various methods, apparatuses/systems, and media for automatically fixing health of a certain component of an application are disclosed. A processor establishes a communication link between an application and a plurality of data sources each storing raw data related to a certain strategy contract data, wherein the raw data includes a header data and a leg data; accesses the plurality of data sources to obtain the raw data from each data source; identifies from the raw data corresponding leg data based on corresponding leg assignment data associated with the strategy contract data; assigns each identified leg data of the strategy contract data a sub key; combines each sub key to generate a unique combination ID; implements the unique combination ID to derive a character string; and executes the derived character string to link together each strategy contract data received from the corresponding data source based on the corresponding leg assignment data.

17 Claims, 6 Drawing Sheets

500

508

TT Leg Data 502

| TT_SECURITY_ID | LEG_SYMBOL | TTLEGKEY (LEG COMBO KEY) 510 | UNIQUE_ID_FUT_OPT | BBG_PRODUCT_CODE | BBGLEGKEY (LEG COMBO KEY) 512 | GL_CODE | GLLEGKEY (LEG COMBO KEY) 514 |
|---|---|---|---|---|---|---|---|
| 2814666808364963370 | FCEN | 20211218UY,2022061SELL | FCEZ1M2 Index | FCE Index | 20211218UY,2022061SELL | FCENF1301754045@0030@019 | 20211218UY,2022061SELL |
| 4986738531853012688 | FCEN | 20210718UY,2021121SELL | FCEN1Z1 Index | FCE Index | 20210718UY,2021121SELL | FCENF1604084596@0030@019 | 20210718UY,2021121SELL |
| 6991137703408436611 | FCEN | 20210718UY,2022061SELL | FCEN1M3 Index | FCE Index | 20210718UY,2022061SELL | FCENF1892648248@0030@019 | 20210718UY,2022061SELL |
| 4545224661679157511 | FCEN | 20210618UY,2021091SELL | FCEM1U1 Index | FCE Index | 20210618UY,2021091SELL | FCENF2372052377@0030@019 | 20210618UY,2021091SELL |

| LEG_SECURITY_ID | LEG_EXDESTINATION | LEG_SECURITY_EXCHANGE | LEG_SECURITY_MONTH_YEAR | LEG_SECURITY_TYPE | LEG_SIDE | LEG_ORDER | RATIO |
|---|---|---|---|---|---|---|---|
| 6692477635379030308 | XEUR | Eurex | 202112 | FUT | 1 | 1 | 1 |
| 1385666465942976849 | XEUR | Eurex | 202206 | FUT | 2 | 2 | 1 |

BBG Leg Data 504

| UNIQUE_ID_FUT_OPT | LEG_DELIVERY_DATE | LEG_SIDE_CD | LEG_TICKER | CREATION_TM | CREATION_ETL_BATCH_ID | RATIO | LEG_ORDER |
|---|---|---|---|---|---|---|---|
| FCEZ1M2 Index | M2 | SELL | FCEM2 Index | 5/25/2021 7:41:55.73800 PM | -8888 | 1 | 2 |
| FCEN1Z1 Index | Z1 | BUY | FCEZ1 Index | 5/25/2021 7:41:55.73700 PM | -8888 | 1 | 1 |

GL Leg Data 506

| GL_CODE | UNDERLYING_GLID_STOCKCODE | UNDERLYING_GL_CODE | UNDERLYING_GLID | UNDERLYING_ID_STOCK |
|---|---|---|---|---|
| FCENF1301754045@0030@017 | 0030000017000FCEM0622 | FCEM0622@0030@017 | 0030000017000 | FCEM0622 |
| FCENF1301754045@0030@017 | 0030000017000FCEN1221 | FCEN1221@0030@017 | 0030000017000 | FCEN1221 |

| UNDERLYING_ID_GL_EXCH | ULTIMATE_UNDER_GLID | ULTIMATE_UNDER_GLID_SYMBOL | ULTIMATE_UNDER_ID_STOCK | ULTIMATE_UNDER_ID_GL_EXCH |
|---|---|---|---|---|
| 0030 | 0030000202000FCEN | 0030000202000 | FCEN | 0030 |
| 0030 | 0030000202000FCEN | 0030000202000 | FCEN | 0030 |

FIG. 5

SYSTEM AND METHOD FOR IMPLEMENTING A LEG COMBINATION CODE GENERATING MODULE

TECHNICAL FIELD

This disclosure generally relates to data processing, and, more particularly, to methods and apparatuses for implementing a leg combination code generating module for generating a unique identifier (ID) to derive a character string configured to join strategy data from various data providers together by their leg assignments data.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

A leg data is one piece of a multi-part trade data, often a derivatives trading strategy data, in which a user (i.e., a trader) or application combines, by utilizing a computing device, multiple options or futures contracts, or (in rarer cases) combinations of both types of contract, to hedge a position, to benefit from arbitrage, or to profit from a spread widening or tightening. Within the strategy data, each derivative contract or position in the underlying security may be called a leg data. Global Instrument Master (GIM) is security data master which is a software configured for combining bits and pieces of the best data about a financial instrument, and then storing that data onto a database accessible to users and applications for consumption. For example, GIM can be system of records for exchange traded reference data in a bank which may provide source data from multiple external data providers or vendors such as Bloomberg (BBG), Reuters (RTR), General Ledger (GL), Chicago Mercantile Exchange (CME), Trading Technologies (TT), etc.

Today, for strategy asset class, for various exchanges, data sources of BBG, RTR, GL, and TT provide their own unique ID at product level and contract level. Product level may define the family or broader category that the contract is associated with (e.g., oil contracts). Contract level may refer to individual contracts within a product level. Contract level may be a sub-set of product level. For example, there might be contract levels for each month/week/day within the product level.

However, in almost all cases, especially for strategies, these data sources do not provide any unique common external ID such as ISIN (International Securities Identification Number), and even in some cases, they provide their own version of exchange tickers or unique IDs. Due to missing cross-links across data set provided by external data provider or vendor (e.g., BBG, RTR, GL and TT), this can either lead to creation of logically duplicate contracts in GIM. If GIM does not implement one creation source of data strategies, however, sometimes that may lead to a missing cross-vendor symbology, i.e., missing Reuters instrument codes in GIM for Eurex (an international exchange which primarily offers trading in European based derivatives) strategies created by BBG data. Within the context of the present disclosure, the term "symbology" as used herein may refer to the character string associated with either product or contract that uniquely identifies the product level or the contract level. Moreover, when strategy contracts come from different vendors, sometimes they are sent without unique IDs. Without these IDs, a system cannot combine this data leading to redundancies and corrupt data. Conventional tools that are currently available are not configured to generate a unique ID that uses legs to join between vendors. These conventional tools mainly rely on a consistent ID on a header data but not the legs data received from these vendors' databases.

Due to this issue associated with conventional tools, there may be many strategies where cross-vendor symbology were missing in GIM. This missing information often results in failed trade execution, failed trade matching, and failed settlement for exchange traded derivative (ETD) business. This in turn may negatively impact a bank's reputation and order flow impacting the bank's business ability to generate revenues.

Thus, there is a need for an advanced tool that can address these conventional shortcomings.

SUMMARY

The present disclosure, through one or more of its various aspects, embodiments, and/or specific features or sub-components, provides, among other features, various systems, servers, devices, methods, media, programs, and platforms for implementing a leg combination code generating module for generating a unique ID to derive a character string configured to join strategy data from various data providers together by their leg assignments data, but the disclosure is not limited thereto.

For example, the present disclosure, through one or more of its various aspects, embodiments, and/or specific features or sub-components, provides, among other features, various systems, servers, devices, methods, media, programs, and platforms for implementing a leg combination code generating module that generates a unique ID (i.e., a unique code or a unique key) that utilizes fundamental data (raw data) sent within contract details to derive a character string which is then used to link contracts from different data providers (e.g., BBG, RTR, GL, CME, and TT) resulting in a refined clean usable data for the downstream systems or applications; enabling a system for higher enrichment rate of cross referencing between multiple vendors data and better data quality (DQ) for data related to strategies; enabling a system to utilize the result of a higher enrichment rate and better DQ thereby resulting in a more consistent trade life cycle process for ETDs when using a system of record, but the disclosure is not limited thereto.

According to an aspect of the present disclosure, a method for generating a unique ID to derive a character string by utilizing one or more processors and one or more memories is disclosed. The method may include: establishing a communication link between an application and a plurality of data sources each storing raw data related to a certain strategy contract data, wherein the raw data includes a header data and a leg data; accessing the plurality of data sources to obtain the raw data from each data source; identifying from the raw data corresponding leg data based on corresponding leg assignment data associated with the strategy contract data; assigning each identified leg data of the strategy contract data a sub key; combining each sub key to generate a unique combination ID; implementing the unique combination ID to derive a character string; and executing the derived character string to link together each strategy contract data received from the corresponding data source based on the corresponding leg assignment data.

According to yet another aspect of the instant disclosure, within each of the strategy contract data, the leg data may represent corresponding derivative contract or position in an underlying security instrument data.

According to a further aspect of the instant disclosure, in accessing the plurality of data sources to obtain raw data from each data source, the method may further include: calling a corresponding application programming interface (API) for each data source; and receiving, in response to calling, the raw data from corresponding data source onto a receiving platform within a computing device.

According to an additional aspect of the instant disclosure, in accessing the plurality of data sources to obtain the raw data from each data source, the method may further include: implementing an automatic scraping algorithm based on standard query language (SQL) to automatically obtain data from each of said plurality of data sources.

According to yet another aspect of the instant disclosure, the method may further include: accessing the raw data from a monitoring platform within the application that allows real-time monitoring of the raw data.

According to yet another aspect of the instant disclosure, the method may further include: displaying an output data onto a graphical user interface (GUI) that illustrates the link as a table format.

According to another aspect of the instant disclosure, a system for generating a unique ID to derive a character string is disclosed. The system may include: a processor; and a memory operatively connected to the processor via a communication interface, the memory storing computer readable instructions, when executed, may cause the processor to: establish a communication link between an application and a plurality of data sources each storing raw data related to a certain strategy contract data, wherein the raw data includes a header data and a leg data; access the plurality of data sources to obtain the raw data from each data source; identify from the raw data corresponding leg data based on corresponding leg assignment data associated with the strategy contract data; assign each identified leg data of the strategy contract data a sub key; combine each sub key to generate a unique combination ID; implement the unique combination ID to derive a character string; and execute the derived character string to link together each strategy contract data received from the corresponding data source based on the corresponding leg assignment data.

According to yet another aspect of the instant disclosure, in accessing the plurality of data sources to obtain raw data from each data source, the processor may be further configured to: call a corresponding API for each data source; and receive, in response to calling, the raw data from corresponding data source onto a receiving platform within a computing device.

According to a further aspect of the instant disclosure, in accessing the plurality of data sources to obtain the raw data from each data source, the processor may be further configured to: implement an automatic scraping algorithm based on SQL to automatically obtain data from each of said plurality of data sources.

According to yet another aspect of the instant disclosure, the processor may be further configured to: access the raw data from a monitoring platform within the application that allows real-time monitoring of the raw data.

According to a further aspect of the present disclosure, wherein, the processor may be further configured to: display an output data onto a GUI that illustrates the link as a table format.

According to yet another aspect of the present disclosure, a non-transitory computer readable medium configured to store instructions for generating a unique ID to derive a character string is disclosed. The instructions, when executed, may cause a processor to perform the following: establishing a communication link between an application and a plurality of data sources each storing raw data related to a certain strategy contract data, wherein the raw data includes a header data and a leg data; accessing the plurality of data sources to obtain the raw data from each data source; identifying from the raw data corresponding leg data based on corresponding leg assignment data associated with the strategy contract data; assigning each identified leg data of the strategy contract data a sub key; combining each sub key to generate a unique combination ID; implementing the unique combination ID to derive a character string; and executing the derived character string to link together each strategy contract data received from the corresponding data source based on the corresponding leg assignment data.

According to a further aspect of the instant disclosure, in accessing the plurality of data sources to obtain raw data from each data source, the instructions, when executed, may cause the processor to perform the following: calling a corresponding API for each data source; and receiving, in response to calling, the raw data from corresponding data source onto a receiving platform within a computing device.

According to an additional aspect of the instant disclosure, in accessing the plurality of data sources to obtain the raw data from each data source, the instructions, when executed, may cause the processor to perform the following: implementing an automatic scraping algorithm based on SQL to automatically obtain data from each of said plurality of data sources.

According to yet another aspect of the instant disclosure, the instructions, when executed, may cause the processor to perform the following: accessing the raw data from a monitoring platform within the application that allows real-time monitoring of the raw data.

According to yet another aspect of the instant disclosure, the instructions, when executed, may cause the processor to perform the following: displaying an output data onto a GUI that illustrates the link as a table format.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 5 illustrates an exemplary derived character string implemented by the platform and language agnostic leg combination code generating module of FIG. 4 in accordance with an exemplary embodiment.

DETAILED DESCRIPTION

Figure 1:
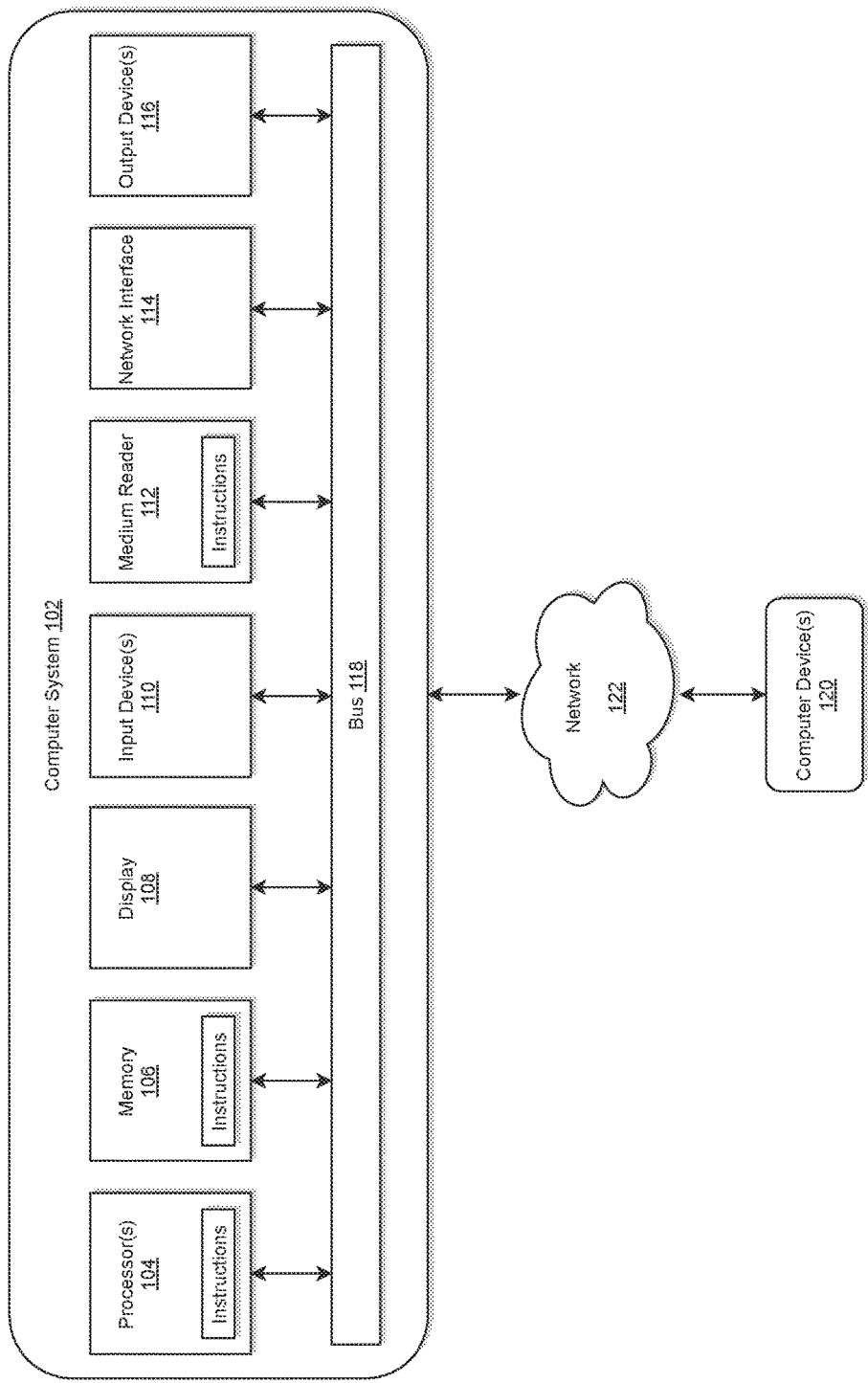
FIG. 1 illustrates a computer system for generating a unique ID to derive a character string configured to join strategy data from various data providers together by their leg assignments data in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system for use in implementing a platform and language agnostic leg combination code generating module for generating a unique ID to derive a character string configured to join strategy data from various data providers together by their leg assignments data in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time.

The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

According to exemplary embodiments, the leg combination code generating module may be platform and language agnostic that may allow for consistent easy orchestration and passing of data through various components to output a desired result. Since the disclosed process, according to exemplary embodiments, is platform and language agnostic, the leg combination code generating module may be independently tuned or modified for optimal performance without affecting the configuration or data files. The configuration or data files, according to exemplary embodiments, may be written using JSON, but the disclosure is not limited thereto. For example, the configuration or data files may easily be extended to other readable file formats such as XML, YAML, etc., or any other configuration based languages.

Figure 2:
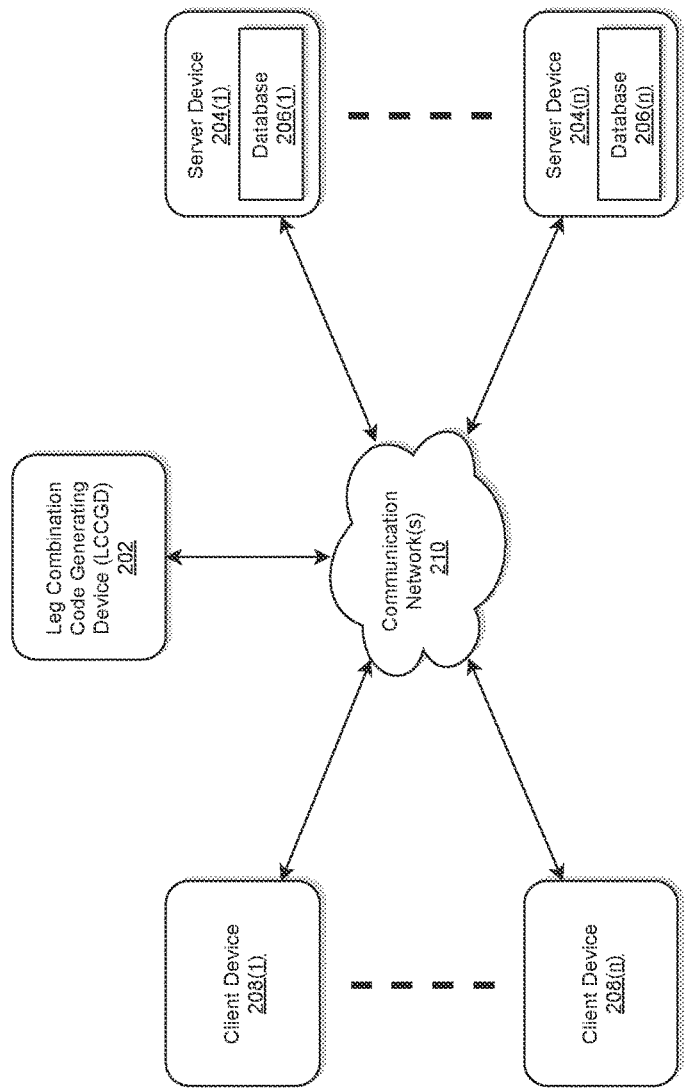
FIG. 2 illustrates an exemplary diagram of a network environment with a platform and language agnostic leg combination code generating device in accordance with an exemplary embodiment.

Referring to FIG. 2, a schematic of an exemplary network environment 200 with a platform and language agnostic leg combination code generating device (LCCGD) of the instant disclosure is illustrated.

According to exemplary embodiments, the above-described problems associated with conventional approach of developing, testing, or managing software application may be overcome by implementing a LCCGD 202 as illustrated in FIG. 2 that may be configured to implement a leg combination code generating module for generating a unique ID to derive a character string configured to join strategy data from various data providers together by their leg assignments data, but the disclosure is not limited thereto. For example, the LCCGD 202 may also provide optimized processes to implement a leg combination code generating module that generates a unique ID (i.e., a unique code or a unique key) that utilizes fundamental data (raw data) sent within contract details to derive a character string which is then used to link contracts from different data providers (e.g., BBG, RTR, GL, CME, and TT) resulting in a refined clean usable data for the downstream systems or applications; enabling a system for higher enrichment rate of cross referencing between multiple vendors data and better DQ for data related to strategies; enabling a system to utilize the result of a higher enrichment rate and better DQ thereby resulting in a more consistent trade life cycle process for ETDs when using a system of record, but the disclosure is not limited thereto.

The LCCGD 202 may be the same or similar to the computer system 102 as described with respect to FIG. 1.

The LCCGD 202 may store one or more applications that can include executable instructions that, when executed by the LCCGD 202, cause the LCCGD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the LCCGD 202 itself, may be located in virtual server(s) running in a cloud-based computing environment rather than being tied to one or more specific physical network computing devices. Also, the application(s) may be running in one or more virtual machines (VMs) executing on the LCCGD 202. Additionally, in one or more embodiments of this technology, virtual machine(s) running on the LCCGD 202 may be managed or supervised by a hypervisor.

In the network environment 200 of FIG. 2, the LCCGD 202 is coupled to a plurality of server devices 204(1)-204(n) that hosts a plurality of databases 206(1)-206(n), and also to a plurality of client devices 208(1)-208(n) via communication network(s) 210. A communication interface of the LCCGD 202, such as the network interface 114 of the computer system 102 of FIG. 1, operatively couples and communicates between the LCCGD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the LCCGD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The LCCGD 202 may be a standalone device or integrated with one or more other devices or apparatuses, such as one or more of the server devices 204(1)-204(n), for example. In one particular example, the LCCGD 202 may be hosted by one of the server devices 204(1)-204(n), and other arrangements are also possible. Moreover, one or more of the devices of the LCCGD 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the LCCGD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the LCCGD 202 that may be configured to implement a leg combination code generating module for generating a unique ID to derive a character string configured to join strategy data from various data providers together by their leg assignments data, but the disclosure is not limited thereto. For example, the client devices 208(1)-208(n) in this example may include any type of computing device that can facilitate the implementation of the LCCGD 202 that may be configured to implement leg combination code generating module that generates a unique ID (i.e., a unique code or a unique key) that utilizes fundamental data (raw data) sent within contract details to derive a character string which is then used to link contracts from different data providers (e.g., BBG, RTR, GL, CME, and TT) resulting in a refined clean usable data for the downstream systems or applications; enabling a system for higher enrichment rate of cross referencing between multiple vendors data and better DQ for data related to strategies; enabling a system to utilize the result of a higher enrichment rate and better DQ thereby resulting in a more consistent trade life cycle process for ETDs when using a system of record, but the disclosure is not limited thereto.

The client devices 208(1)-208(n) may run interface applications, such as standard web browsers or standalone client applications, which may provide an interface to communicate with the LCCGD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the LCCGD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the LCCGD 202, the server devices 204(1)-204(n), or the client devices 208(1)-208(n), for example, may be configured to operate as virtual instances on the same physical machine. For example, one or more of the LCCGD 202, the server devices 204(1)-204(n), or the client devices 208(1)-208(n) may operate on the same physical device rather than as separate devices communicating through communication network(s) 210. Additionally, there may be more or fewer LCCGDs 202, server devices 204(1)-204(n), or client devices 208(1)-208(n) than illustrated in FIG. 2. According to exemplary embodiments, the LCCGD 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
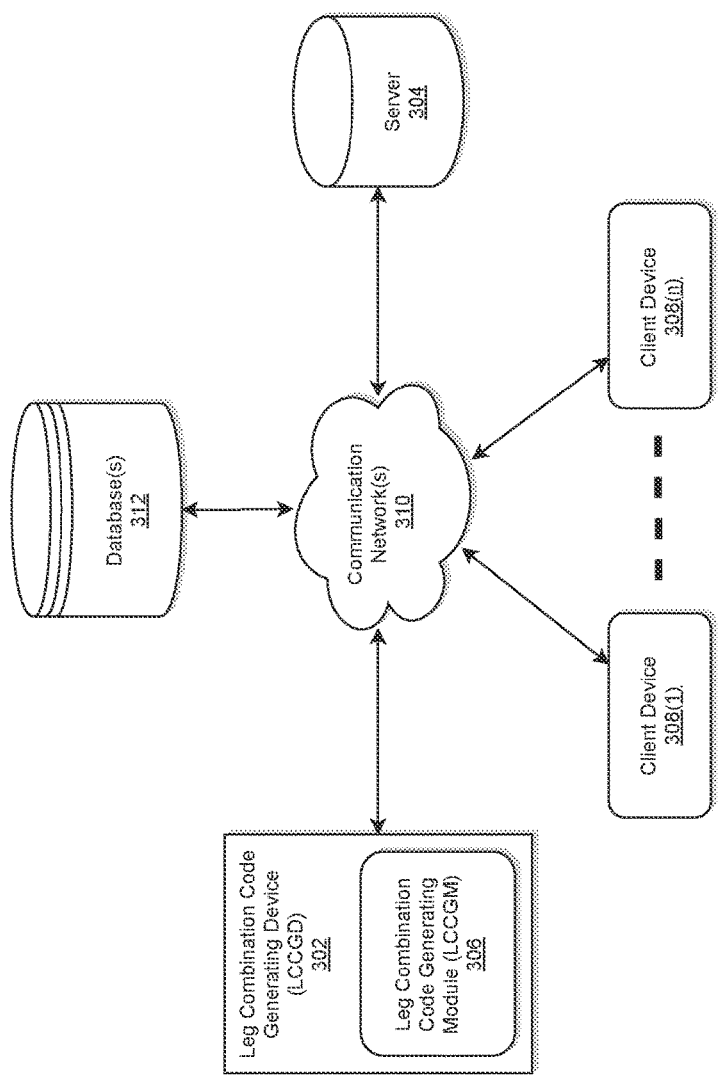
FIG. 3 illustrates a system diagram for implementing a platform and language agnostic leg combination code generating device having a platform and language agnostic leg combination code generating module in accordance with an exemplary embodiment.

FIG. 3 illustrates a system diagram for implementing a platform and language agnostic leg combination code generating device (LCCGD) having a platform and language agnostic leg combination code generating module (LCCGM) for generating a unique ID to derive a character string configured to join strategy data from various data providers together by their leg assignments data in accordance with an exemplary embodiment.

As illustrated in FIG. 3, the system 300 may include a LCCGD 302 within which a LCCGM 306 is embedded, a server 304, a database(s) 312, a plurality of client devices 308(1) . . . 308(n), and a communication network 310.

According to exemplary embodiments, the LCCGD 302 including the LCCGM 306 may be connected to the server 304, and the database(s) 312 via the communication network 310. The LCCGD 302 may also be connected to the plurality of client devices 308(1) . . . 308(n) via the communication network 310, but the disclosure is not limited thereto.

According to exemplary embodiment, the LCCGD 302 is described and shown in FIG. 3 as including the LCCGM 306, although it may include other rules, policies, modules, databases, or applications, for example. According to exemplary embodiments, the database(s) 312 may be configured to store ready to use modules written for each API for all environments. Although only one database is illustrated in FIG. 3, the disclosure is not limited thereto. Any number of desired databases may be utilized for use in the disclosed invention herein.

According to exemplary embodiments, the LCCGM 306 may be configured to receive real-time feed of data from the plurality of client devices 308(1) . . . 308(n) via the communication network 310.

As will be described below, the LCCGM 306 may be configured to establish a communication link between an application (i.e., a processor embedded within the LCCGD 302, but the disclosure is not limited thereto) and a plurality of data sources (e.g., two or more databases 312) each storing raw data related to a certain strategy contract data, wherein the raw data includes a header data and a leg data; access the plurality of data sources to obtain the raw data from each data source; identify from the raw data corresponding leg data based on corresponding leg assignment data associated with the strategy contract data; assign each identified leg data of the strategy contract data a sub key; combine each sub key to generate a unique combination ID; implement the unique combination ID to derive a character string; and execute the derived character string to link together each strategy contract data received from the corresponding data source based on the corresponding leg assignment data, but the disclosure is not limited thereto.

According to exemplary embodiments, header data may simply include the name of an underlying security instrument. Within each of the strategy contract data, the leg data may represent corresponding derivative contract or position in an underlying security instrument data.

The plurality of client devices 308(1) . . . 308(n) are illustrated as being in communication with the LCCGD 302. In this regard, the plurality of client devices 308(1) . . . 308(n) may be "clients" of the LCCGD 302 and are described herein as such. Nevertheless, it is to be known and understood that the plurality of client devices 308(1) . . . 308(n) need not necessarily be "clients" of the LCCGD 302, or any entity described in association therewith herein. Any additional or alternative relationship may exist between either or both of the plurality of client devices 308(1) . . . 308(n) and the LCCGD 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the LCCGD 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The LCCGD 302 may be the same or similar to the LCCGD 202 as described with respect to FIG. 2, including any features or combination of features described with respect thereto.

Figure 4:
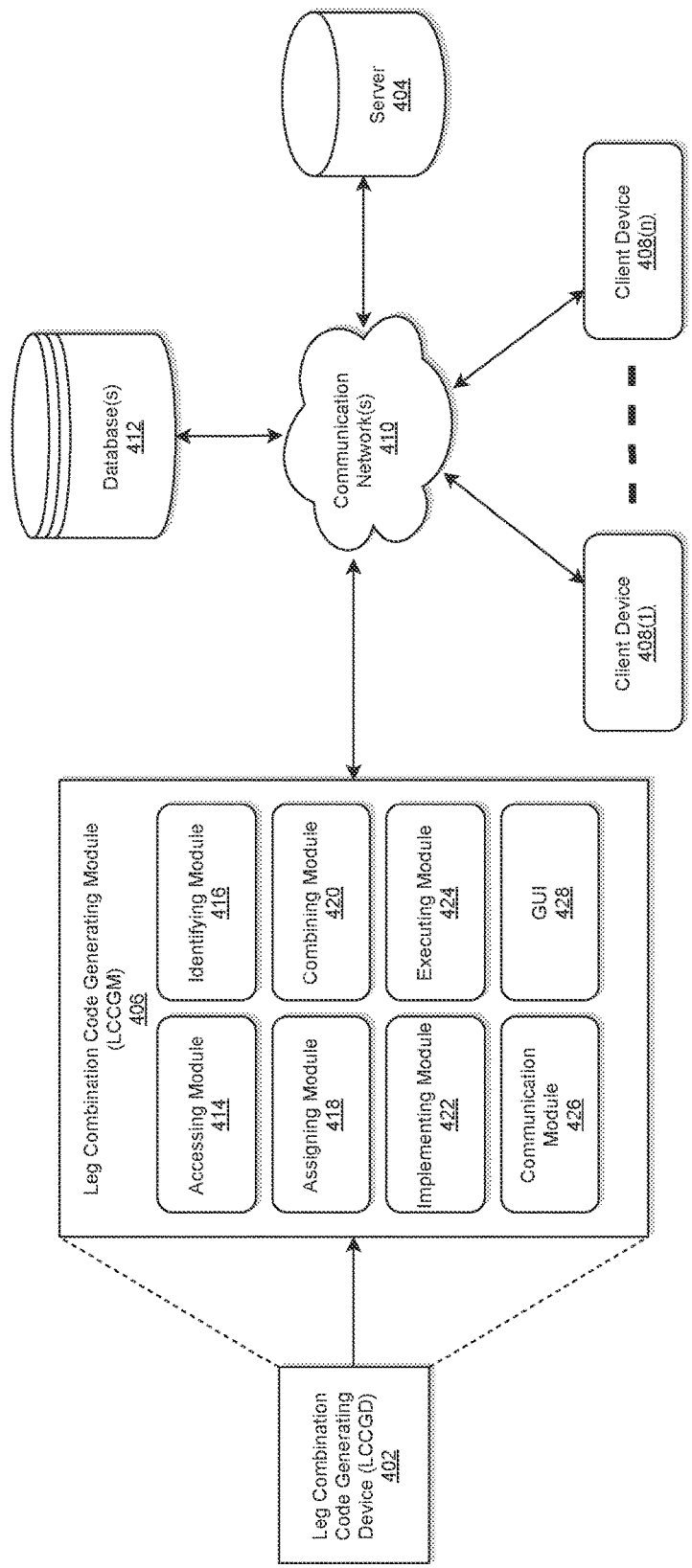
FIG. 4 illustrates a system diagram for implementing a platform and language agnostic leg combination code generating module of FIG. 3 in accordance with an exemplary embodiment.

FIG. 4 illustrates a system diagram for implementing a platform and language agnostic LCCGM of FIG. 3 for generating a unique ID to derive a character string configured to join strategy data from various data providers together by their leg assignments data in accordance with an exemplary embodiment.

According to exemplary embodiments, the system 400 may include a platform and language agnostic LCCGD 402 within which a platform and language agnostic LCCGM 406 is embedded, a server 404, database(s) 412, and a communication network 410.

According to exemplary embodiments, the LCCGD 402 including the LCCGM 406 may be connected to the server 404 and the database(s) 412 via the communication network 410. The LCCGD 402 may also be connected to the plurality of client devices 408(1)-408(n) via the communication network 410, but the disclosure is not limited thereto. The LCCGM 406, the server 404, the plurality of client devices 408(1)-408(n), the database(s) 412, the communication network 410 as illustrated in FIG. 4 may be the same or similar to the LCCGM 306, the server 304, the plurality of client devices 308(1)-308(n), the database(s) 312, the communication network 310, respectively, as illustrated in FIG. 3.

According to exemplary embodiments, as illustrated in FIG. 4, the LCCGM 406 may include an accessing module 414, an identifying module 416, an assigning module 418, a combining module 420, an implementing module 422, an executing module 424, a communication module 426, and a GUI 428.

According to exemplary embodiments, each of the accessing module 414, identifying module 416, assigning module 418, combining module 420, implementing module 422, executing module 424, and the communication module 426 of the LCCGM 406 may be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies.

According to exemplary embodiments, each of the accessing module 414, identifying module 416, assigning module 418, combining module 420, implementing module 422, executing module 424, and the communication module 426 of the LCCGM 406 may be implemented by microprocessors or similar, and may be programmed using software (e.g., microcode) to perform various functions discussed herein and may optionally be driven by firmware and/or software.

Alternatively, according to exemplary embodiments, each of the accessing module 414, identifying module 416, assigning module 418, combining module 420, implementing module 422, executing module 424, and the communication module 426 of the LCCGM 406 may be implemented by dedicated hardware, or as a combination of dedicated hardware to perform some functions and a processor (e.g., one or more programmed microprocessors and associated circuitry) to perform other functions.

According to exemplary embodiments, each of the accessing module 414, identifying module 416, assigning module 418, combining module 420, implementing module 422, executing module 424, and the communication module 426 of the LCCGM 406 may be called via corresponding API.

The process may be executed via the communication module 426 and the communication network 410, which may comprise plural networks as described above. For example, in an exemplary embodiment, the various components of the LCCGM 406 may communicate with the server 404, and the database(s) 412 via the communication module 426 and the communication network 410. Of course, these embodiments are merely exemplary and are not limiting or exhaustive.

According to exemplary embodiments, the communication network 410 and the communication module 426 may be configured to establish a link between the database(s) 412, the client devices 408(1)-408(n) and the LCCGM 406. According to exemplary embodiments, the database(s) 412 may include databases for, e.g., BBG, RTR, GL, CME, and TT data, but the disclosure is not limited thereto.

For example, according to exemplary embodiments, the communication module 426 may be configured to establish a communication link between an application (i.e., a processor embedded within the LCCGD 402 or the LCCGM 406) and a plurality of data sources (e.g., BBG, RTR, GL, CME, and TT data sources, but the disclosure is not limited thereto) each storing raw data related to a certain strategy contract data. The raw data may include a header data and a leg data. According to exemplary embodiments, within each of the strategy contract data, the leg data may represent corresponding derivative contract or position in an underlying security instrument data.

According to exemplary embodiments, the accessing module 414 may be configured to access the plurality of data sources (e.g., BBG, RTR, GL, CME, and TT data sources) to obtain the raw data from each data source. In accessing the plurality of data sources to obtain raw data from each data source, the accessing module 414 may be configured to call a corresponding API for each data source and receiving, in response to calling the corresponding API, the raw data from the corresponding data source onto a receiving platform within a computing device (i.e., client device 408(1)). For example, the accessing module may be configured to call: a BBG API to access raw data from the BBG data source; an RTT API to access raw data from the RTR data source; a GL API to access raw data from the GL data source; a CME API to access raw data from the CME data source; and a TT API to access raw data from the TT data source, but the disclosure is not limited thereto.

According to exemplary embodiments, the identifying module 416 may be configured to identify from the raw data corresponding leg data based on corresponding leg assignment data associated with the strategy contract data.

According to exemplary embodiments, the assigning module 418 may be configured to assign each identified leg data of the strategy contract data a sub key and the combining module 420 may be configured to combine each sub key to generate a unique combination ID.

According to exemplary embodiments, the implementing module 422 may be configured to implement the unique combination ID to derive a character string; and the executing module 424 may be configured to execute the derived character string to link together each strategy contract data received from the corresponding data source based on the corresponding leg assignment data.

According to exemplary embodiments, in accessing the plurality of data sources to obtain the raw data from each data source, the implementing module 422 may be configured to implement an automatic scraping algorithm based on SQL to automatically obtain data from each of said plurality of data sources.

According to exemplary embodiments, the accessing module 414 may be configured to access the raw data from a monitoring platform within the application that allows real-time monitoring of the raw data.

According to exemplary embodiments, the LCCGM 406 may be configured to display an output data onto the GUI 428 that illustrates the link as a table format (see, e.g., FIG. 5).

For example, FIG. 5 illustrates an exemplary derived character string implemented by the platform and language agnostic LCCGM 406 of FIG. 4 in accordance with an exemplary embodiment.

As illustrated in FIG. 5, the screen shot 500 displays four tables on the GUI 428. The first table 508 displays a combination table that illustrates the character string implemented by the LCCGM 406 is derived from a TT log data table 502, a BBG log data table 504, and a GL log data table 506 by applying the processes disclosed above with respect to FIG. 4. For example, the TT leg key (leg combination key) 510 is derived from the TT log data table 502, the BBG leg key (leg combination key) 512 is derived from BBG log data table 504, and the GL leg key (leg combination key) 514 is derived from GL log data table 506.

As illustrated in the first table 508, the leg combination key derived by the LCCGM 406 is the same unique ID (e.g., 2021121BUY,2022061SELL) to derive a character string that joins strategy data from each of TT, BBG, and GL data source together by their leg assignments data.

For example, as illustrated in FIG. 5, standard strategy data comprised of year and month of the associated individual leg plus ratio quantity (or number of legs for each leg associated to the strategy) plus buy or sell side for the given leg associated to the strategy. Each leg of the strategy is assigned a sub key then joined to form the main key which can be compared and joined accordingly between different data sources (i.e., TT, BBG, GL, etc.). In this example, "2021121BUY,2022061SELL" is the unique combination key generated by the LCCGM 406 that utilizes fundamental data (raw data) sent within contract details to derive a character string which is then used to link contracts from different data providers (i.e., TT, BBG, GL, etc.) resulting in a refined clean usable data (e.g., table 508) for the downstream systems or applications; enabling a system for higher enrichment rate of cross referencing between multiple vendors data and better DQ for data related to strategies; enabling a system to utilize the result of a higher enrichment rate and better DQ thereby resulting in a more consistent trade life cycle process for ETDs when using a system of record, but the disclosure is not limited thereto.

Figure 6:
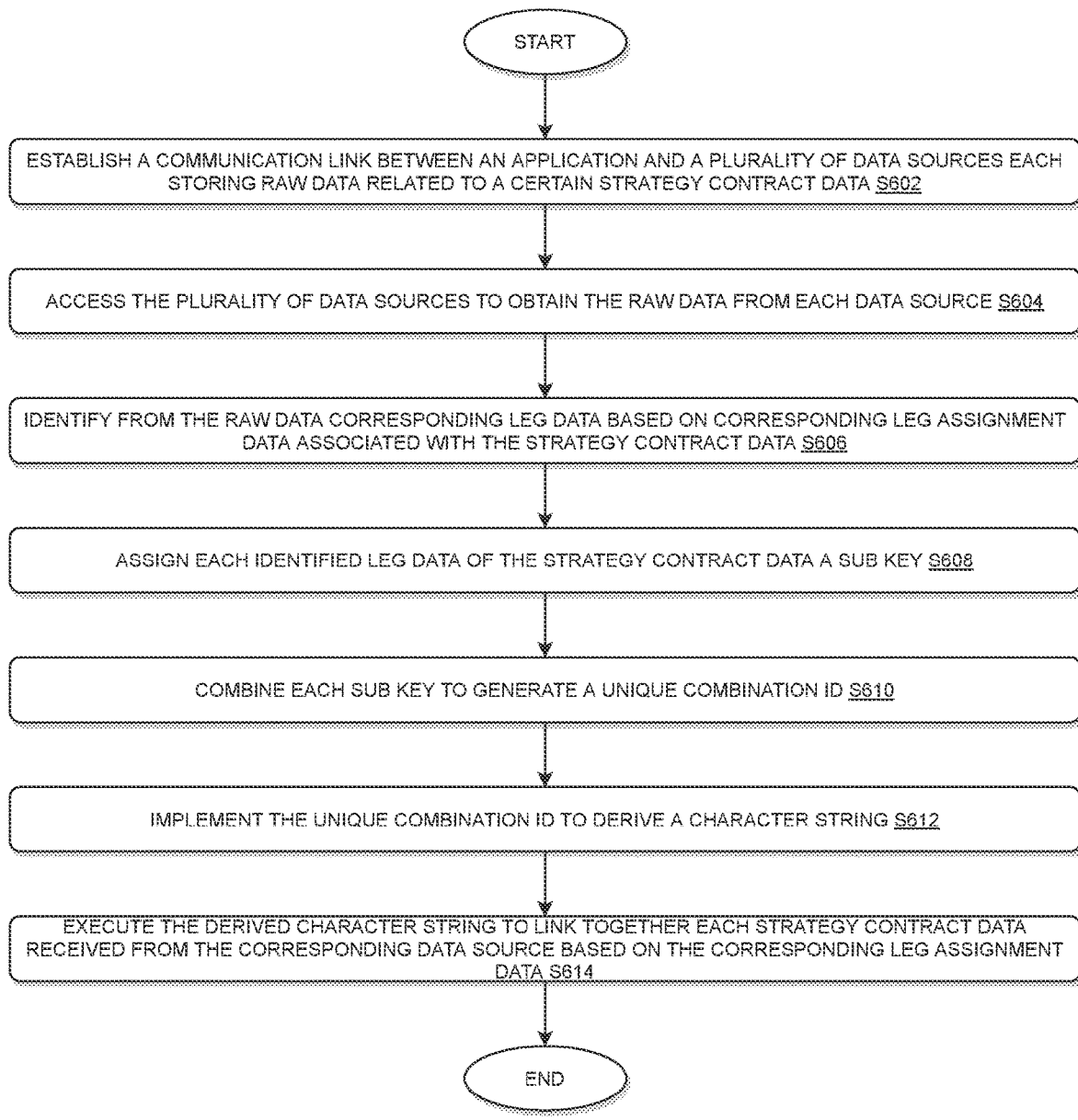
FIG. 6 illustrates a flow chart of process implemented by the platform and language agnostic leg combination code generating module of FIG. 4 in accordance with an exemplary embodiment.

FIG. 6 illustrates a flow chart of a process 600 for implementing the LCCGM 406 that provides a platform for generating a unique ID to derive a character string configured to join strategy data from various data providers together by their leg assignments data in accordance with an exemplary embodiment. It will be appreciated that the illustrated process 600 and associated steps may be performed in a different order, with illustrated steps omitted, with additional steps added, or with a combination of reordered, combined, omitted, or additional steps.

As illustrated in FIG. 6, at step S602, the process 600 may include establishing a communication link between an application and a plurality of data sources each storing raw data related to a certain strategy contract data, wherein the raw data includes a header data and a leg data.

At step S604, the process 600 may include accessing the plurality of data sources to obtain the raw data from each data source.

At step S606, the process 600 may include identifying from the raw data corresponding leg data based on corresponding leg assignment data associated with the strategy contract data.

At step S608, the process 600 may include assigning each identified leg data of the strategy contract data a sub key.

At step S610, the process 600 may include combining each sub key to generate a unique combination ID.

At step S612, the process 600 may include implementing the unique combination ID to derive a character string.

At step S614, the process 600 may include executing the derived character string to link together each strategy contract data received from the corresponding data source based on the corresponding leg assignment data.

According to exemplary embodiments, in accessing the plurality of data sources to obtain raw data from each data source, the method may further include: calling a corresponding application programming interface (API) for each data source; and receiving, in response to calling, the raw data from corresponding data source onto a receiving platform within a computing device.

According to exemplary embodiments, in accessing the plurality of data sources to obtain the raw data from each data source, the process 600 may further include: implementing an automatic scraping algorithm based on SQL to automatically obtain data from each of said plurality of data sources.

According to exemplary embodiments, the process 600 may further include: accessing the raw data from a monitoring platform within the application that allows real-time monitoring of the raw data.

According to exemplary embodiments, the process 600 may further include: displaying an output data onto a GUI that illustrates the link as a table format.

According to exemplary embodiments, the LCCGD 402 may include a memory (e.g., a memory 106 as illustrated in FIG. 1) which may be a non-transitory computer readable medium that may be configured to store instructions for implementing a LCCGM 406 for generating a unique ID to derive a character string process as disclosed herein. The LCCGD 402 may also include a medium reader (e.g., a medium reader 112 as illustrated in FIG. 1) which may be configured to read any one or more sets of instructions, e.g., software, from any of the memories described herein. The instructions, when executed by a processor embedded within the LCCGM 406, 506 or within the LCCGD 402, may be used to perform one or more of the methods and processes as described herein. In a particular embodiment, the instructions may reside completely, or at least partially, within the memory 106, the medium reader 112, and/or the processor 104 (see FIG. 1) during execution by the LCCGD 402.

According to exemplary embodiments, the instructions, when executed, may cause a processor embedded within the LCCGM 406 or the LCCGD 402 to perform the following: establishing a communication link between an application and a plurality of data sources each storing raw data related to a certain strategy contract data, wherein the raw data includes a header data and a leg data; accessing the plurality of data sources to obtain the raw data from each data source; identifying from the raw data corresponding leg data based on corresponding leg assignment data associated with the strategy contract data; assigning each identified leg data of the strategy contract data a sub key; combining each sub key to generate a unique combination ID; implementing the unique combination ID to derive a character string; and executing the derived character string to link together each strategy contract data received from the corresponding data source based on the corresponding leg assignment data. The processor may be the same or similar to the processor 104 as illustrated in FIG. 1 or the processor embedded within LCCGD 202, LCCGD 302, LCCGD 402, and LCCGM 406.

According to exemplary embodiments, in accessing the plurality of data sources to obtain raw data from each data source, the instructions, when executed, may further cause the processor 104 to perform the following: calling a corresponding API for each data source; and receiving, in response to calling, the raw data from corresponding data source onto a receiving platform within a computing device.

According to exemplary embodiments, in accessing the plurality of data sources to obtain the raw data from each data source, the instructions, when executed, may further cause the processor 104 to perform the following: implementing an automatic scraping algorithm based on SQL to automatically obtain data from each of said plurality of data sources.

According to exemplary embodiments, the instructions, when executed, may further cause the processor 104 to perform the following: accessing the raw data from a monitoring platform within the application that allows real-time monitoring of the raw data.

According to exemplary embodiments, the instructions, when executed, may further cause the processor 104 to perform the following: displaying an output data onto a GUI that illustrates the link as a table format.

According to exemplary embodiments as disclosed above in FIGS. 1-6, technical improvements effected by the instant disclosure may include a platform for implementing a platform and language agnostic leg combination code generating module for generating a unique ID to derive a character string configured to join strategy data from various data providers together by their leg assignments data, but the disclosure is not limited thereto.

For example, according to exemplary embodiments as disclosed above in FIGS. 1-6, technical improvements effected by the instant disclosure may include a platform that may also provide optimized processes of implementing a platform and language agnostic leg combination code generating module that generates a unique ID (i.e., a unique code or a unique key) that utilizes fundamental data (raw data) sent within contract details to derive a character string which is then used to link contracts from different data providers (e.g., BBG, RTR, GL, CME, and TT) resulting in a refined clean usable data for the downstream systems or applications; enabling a system for higher enrichment rate of cross referencing between multiple vendors data and better DQ for data related to strategies; enabling a system to utilize the result of a higher enrichment rate and better DQ thereby resulting in a more consistent trade life cycle process for ETDs when using a system of record, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for generating a unique identifier (ID) to derive a character string by utilizing one or more processors and one or more memories, the method comprising:

implementing a leg combination code generating module (LCCGM) that generates a unique combination ID that utilizes raw data sent within contract details to derive a character string which is then used to link contracts from different data providers resulting in a refined clean usable data for downstream systems or applications, wherein the LCCGM includes an accessing module, an identifying module, an assigning module, a combining module, an implementing module, an executing module, and a communication module, and wherein each of the accessing module, the identifying module, the assigning module, the combining module the implementing module, the executing module, and the communication module of the LCCGM is called via corresponding Application Programming Interface (API);

establishing a communication link between the LCCGM and a plurality of data sources each storing the raw data related to a certain strategy contract data, wherein the raw data includes a header data and a leg data by calling the communication module via a first API;

accessing the plurality of data sources to obtain the raw data from each data source by calling the accessing module via a second API;

identifying from the raw data corresponding leg data based on corresponding leg assignment data associated with the strategy contract data by calling the identifying module via a third API;

assigning each identified leg data of the strategy contract data a sub key by calling the assigning module via a fourth API;

combining each sub key to generate a unique combination ID by calling the combining module via a fifth API;

implementing the unique combination ID to derive a character string by calling the implementing module via a sixth API;

executing the derived character string to link together each strategy contract data received from the corresponding data source based on the corresponding leg assignment data by calling the executing module via a seventh API; and displaying an output data onto a graphical user interface (GUI) that illustrates the link as a table format, wherein the table displays a combination table illustrating the character string implemented by the LCCGM is derived from a first log data table associated with a first data source, a second log data table associated with a second data source, and a third log data table associated with a third data source by implementing the unique combination ID, and wherein corresponding sub key derived by the LCCGM is the same unique ID to derive a character string that joins strategy contract data from each of said first, second, and third data source together by their leg assignments data.

2. The method according to claim 1, wherein, within each of said strategy contract data, the leg data represents corresponding derivative contract or position in an underlying security instrument data.

3. The method according to claim 1, wherein the LCCGM is a processor embedded within a computing device.

4. The method according to claim 1, wherein, in accessing the plurality of data sources to obtain raw data from each data source, the method further comprising:
calling a corresponding API for each data source; and
receiving, in response to calling, the raw data from corresponding data source onto a receiving platform within a computing device.

5. The method according to claim 1, wherein, in accessing the plurality of data sources to obtain the raw data from each data source, the method further comprising:
implementing an automatic scraping algorithm based on standard query language (SQL) to automatically obtain data from each of said plurality of data sources.

6. The method according to claim 5, the method further comprising:
accessing the raw data from a monitoring platform within the LCCGM that allows real-time monitoring of the raw data.

7. A system for generating a unique identifier (ID) to derive a character string, the system comprising:
a processor; and a memory operatively connected to the processor via a communication interface, the memory storing computer readable instructions, when executed, causes the processor to:
implement a leg combination code generating module (LCCGM) that generates a unique combination ID that utilizes raw data sent within contract details to derive a character string which is then used to link contracts from different data providers resulting in a refined clean usable data for downstream systems or applications, wherein the LCCGM includes an accessing module, an identifying module, an assigning module, a combining module, an implementing module, an executing module, and a communication module, and wherein each of the accessing module, the identifying module, the assigning module, the combining module the implementing module, the executing module, and the communication module of the LCCGM is called via corresponding Application Programming Interface (API);
establish a communication link between the LCCGM and a plurality of data sources each storing the raw data related to a certain strategy contract data, wherein the raw data includes a header data and a leg data by calling the communication module via a first API;
access the plurality of data sources to obtain the raw data from each data source by calling the accessing module via a second API;
identify from the raw data corresponding leg data based on corresponding leg assignment data associated with the strategy contract data by calling the identifying module via a third API;
assign each identified leg data of the strategy contract data a sub key by calling the assigning module via a fourth API;
combine each sub key to generate a unique combination ID by calling the combining module via a fifth API;
implement the unique combination ID to derive a character string by calling the implementing module via a sixth API;
execute the derived character string to link together each strategy contract data received from the corresponding data source based on the corresponding leg assignment data by calling the executing module via a seventh API; and
display an output data onto a graphical user interface (GUI) that illustrates the link as a table format, wherein the table displays a combination table illustrating the character string implemented by the LCCGM is derived from a first log data table associated with a first data source, a second Jog data table associated with a second data source, and a third log data table associated with a third data source by implementing the unique combination ID, and wherein corresponding sub key derived by the LCCGM to the same unique ID to derive a character string that joins strategy contract data from each of said first, second, and third data source together by their leg assignments data.

8. The system according to claim 7, wherein, within each of said strategy contract data, the leg data represents corresponding derivative contract or position in an underlying security instrument data.

9. The system according to claim 7, wherein, within each of said strategy contract data, the leg data represents corresponding position in an underlying security instrument data.

10. The system according to claim 7, wherein, in accessing the plurality of data sources to obtain raw data from each data source, the processor is further configured to:
call a corresponding API for each data source; and
receive, in response to calling, the raw data from corresponding data source onto a receiving platform within a computing device.

11. The system according to claim 7, wherein, in accessing the plurality of data sources to obtain the raw data from each data source, the processor further configured to:
implement an automatic scraping algorithm based on standard query language (SQL) to automatically obtain data from each of said plurality of data sources.

12. The system according to claim 11, the processor further configured to:
access the raw data from a monitoring platform within the LCCGM that allows real-time monitoring of the raw data.

13. A non-transitory computer readable medium configured to store instructions for generating a unique identifier (ID) to derive a character string, wherein, when executed, the instructions cause a processor to perform the following:
implementing a leg combination code generating module (LCCGM) that generates a unique combination ID that utilizes raw data sent within contract details to derive a character string which is then used to link contracts from different data providers resulting in a refined clean usable data for downstream systems or applications, wherein the LCCGM includes an accessing module, an identifying module, an assigning module, a combining module, an implementing module, an executing module, and a communication module, and wherein each of the accessing module, the identifying module, the assigning module, the combining module the implementing module, the executing module, and the communication module of the LCCGM is called via corresponding Application Programming Interface (API);
establishing a communication link between the LCCGM and a plurality of data sources each storing the raw data related to a certain strategy contract data, wherein the raw data includes a header data and a leg data by calling the communication module via a first API;

accessing the plurality of data sources to obtain the raw data from each data source by calling the accessing module via a second API;
identifying from the raw data corresponding leg data based on corresponding leg assignment data associated with the strategy contract data by calling the identifying module via a third API;
assigning each identified leg data of the strategy contract data a sub key by calling the assigning module via a fourth API;
combining each sub key to generate a unique combination ID by calling the combining module via a filth API;
implementing the unique combination ID to derive a character string by calling the implementing module via a sixth API;
executing the derived character string to link together each strategy contract data received from the corresponding data source based on the corresponding leg assignment data by calling the executing module via a seventh API; and
displaying an output data onto a graphical user interface (GUI) that illustrates the link as a table format, wherein the table displays a combination table illustrating the character string implemented by the LCCGM is derived from a first fog data table associated with a first data source, a second log data table associated with a second data source, and a third log data table associated with a third data source by implementing the unique combination ID, and wherein corresponding sub key derived by the LCCGM to the same unique ID to derive a character string that joins strategy contract data from each of said first, second, and third data source together by their leg assignments data.

14. The non-transitory computer readable medium according to claim 13, wherein, within each of said strategy contract data, the leg data represents corresponding derivative contract or position in an underlying security instrument data.

15. The non-transitory computer readable medium according to claim 13, wherein, in accessing the plurality of data sources to obtain raw data from each data source, the instructions, when executed, further cause the processor to perform the following:
 calling a corresponding API for each data source; and
 receiving, in response to calling, the raw data from corresponding data source onto a receiving platform within a computing device.

16. The non-transitory computer readable medium according to claim 13, wherein, in accessing the plurality of data sources to obtain the raw data from each data source, the instructions, when executed, further cause the processor to perform the following:
 implementing an automatic scraping algorithm based on standard query language (SQL) to automatically obtain data from each of said plurality of data sources.

17. The non-transitory computer readable medium according to claim 16, wherein the instructions, when executed, further cause the processor to perform the following:
 accessing the raw data from a monitoring platform within the LCCGM that allows real-time monitoring of the raw data.

* * * * *